United States Patent [19]

Worcester et al.

[11] Patent Number: 4,816,214

[45] Date of Patent: Mar. 28, 1989

[54] ULTRA SLOW EB MELTING TO REDUCE REACTOR CLADDING

[75] Inventors: Samuel A. Worcester; Charles R. Woods; Glenn S. Galer; Richard L. Propst, all of Ogden, Utah

[73] Assignee: Westinghouse Electric Corp., Pittsburgh, Pa.

[21] Appl. No.: 111,230

[22] Filed: Oct. 22, 1987

[51] Int. Cl.$^4$ .............................................. G21C 3/00
[52] U.S. Cl. .................................. 376/416; 75/65 EB
[58] Field of Search ............... 376/416, 417, 414, 410, 376/900, 419; 75/65 EB, 65 ZM, 65 R

[56] References Cited

U.S. PATENT DOCUMENTS

| | | | |
|---|---|---|---|
| 2,772,964 | 6/1956 | Thomas | 75/177 |
| 2,880,483 | 4/1959 | Hanks | 22/57.2 |
| 2,935,395 | 5/1960 | Smith | 75/10 |
| 2,942,098 | 6/1960 | Smith | 219/121 |
| 2,960,331 | 11/1960 | Hanks | 266/34 |
| 2,963,530 | 12/1960 | Hanks | 13/31 |
| 2,997,760 | 8/1961 | Hanks | 22/200.1 |
| 3,087,211 | 4/1963 | Howe | 22/57.2 |
| 3,091,525 | 5/1963 | D'A Hunt | 75/84 |
| 3,097,094 | 7/1963 | Rubenstein | 75/177 |
| 3,148,055 | 9/1964 | Kass | 75/177 |
| 3,219,435 | 11/1965 | Gruber | 75/10 |
| 3,226,223 | 12/1965 | Bussard | 75/10 |
| 3,615,345 | 10/1971 | King | 75/10 |
| 3,764,297 | 10/1973 | Coad | 75/10 |
| 4,094,706 | 6/1978 | Schulson | 148/11.5 F |
| 4,108,644 | 8/1978 | Walberg | 75/135 |
| 4,130,416 | 12/1978 | Zaboronok | 75/10 R |
| 4,190,404 | 2/1980 | Drs | 425/8 |
| 4,200,492 | 4/1980 | Armijo | 376/417 |
| 4,306,887 | 12/1981 | Barosi | 55/68 |
| 4,368,072 | 1/1983 | Siddell | 75/84.4 |
| 4,372,817 | 2/1983 | Armijo | 376/417 |
| 4,482,376 | 11/1984 | Tarasesca | 75/10 R |
| 4,613,479 | 5/1987 | Foster | 376/416 |
| 4,668,287 | 5/1987 | Kwon | 75/84.5 |
| 4,675,153 | 6/1987 | Boyle | 376/416 |
| 4,722,827 | 2/1988 | Kwon | 420/422 |
| 4,735,768 | 4/1988 | Stenle | 376/417 |

FOREIGN PATENT DOCUMENTS 144789 8/1979 Japan .

OTHER PUBLICATIONS

Kass, The Development of the Zircaloys ASTM-STP-368 (1964), pp. 3–27, ASTM Spec B349-80, "Zirconium Sponge and Other Forms of Virgin Metal for Nuclear Applications".

*Primary Examiner*—Donald P. Walsh
*Attorney, Agent, or Firm*—R. A. Stoltz

[57] ABSTRACT

This is a process for producing material for lining reactor fuel element claddings. Rather than using unalloyed zirconium, this invention provides for an alloy liner for the cladding. The process uses ultra-slow electron beam melting of zirconium, to give very low metallic impurities to reduce solid solution strengthening and second phase formation and property variability from lot to lot, while using alloying to reduce the susceptibility to steam corrosion. Oxygen is controlled to a very low level as well, and preferably only 0.1–0.4 tin is added to provide a low, but fabricable, hardness in the alloyed liner material.

7 Claims, No Drawings

ULTRA SLOW EB MELTING TO REDUCE REACTOR CLADDING

CROSS-REFERENCE TO RELATED APPLICATIONS

U.S. patent application Ser. No. 780,392, filed Sept. 26, 1985, describes a process for producing zirconium or hafnium utilizing a precharge of molten salt during reduction of zirconium tetrachloride to metal. The process uses a combination reduction-distillation vessel. The precharge of salt prevents reduction of metal outside the liner, facilitating removal of the liner after the reduction-distillation is completed. Copending U.S. patent application Ser. No. 780,343, filed Sept. 26, 1985, describes a high purity material having 500–1000 ppm of total impurities. Such material might be produced, for example, by the aforementioned process in Ser. No. 780,392 in a combined reduction-distillation vessel.

A related process is described in copending U.S. patent application Ser. No. 871,182, filed June 5, 1986. That related application also produces high purity material, utilizing an electron beam melting step following prebaking of the material and produces a low iron (50–300 ppm) low oxygen (250–350 ppm) for use as a liner material for reactor fuel element cladding.

A related process is described in copending application Ser. No. 871,183, filed June 5, 1986, which also produces high purity material for the same uses as the preceding copending application and also uses essentially the same electron beam melting step (broadly at 1–20, but typically at about 4–16 inches per hour), but rather than requiring prebaking, utilizes a vacuum arc melting step after the EB melting to homogenize the material.

A related process is described in copending U.S. patent application Ser. No. 030,007, filed Mar. 23, 1987, which produces zirconium with a low iron content, that application utilizes a modified, somewhat lower temperature distillation step (the distillation step, which is after reduction, but prior to melting, removes magnesium chloride and magnesium from the zirconium sponge produced by the reduction).

A method for the reduction of the oxygen content in magnesium (which low oxygen content magnesium may in be used in producing low oxygen zirconium), is described in copending U.S. patent application Ser. No. 17,301, filed Feb. 20, 1987. In that application, magnesium, in a molten state is contacted by a solid particulate metal such as zirconium or titanium. When the molten magnesium is separated from the particulate metal, the oxygen content of the magnesium metal has been substantially reduced. In addition, nickel, iron, chromium, and aluminum content of the magnesium may also be reduced.

Copending U.S. patent application Ser. No. 111,231 (W. E. Case 54,132), filed 10-22-87, provides an ultrapure alloy of tin and zirconium which provides a ductile, but reliably fabricatible liner material having somewhat better corrosion resistance than unalloyed zirconium, and also believed to give better crack propagation resistance under irradiation at a reliably fabricatible hardness than any other material.

The following copending applications describe various zirconium alloys; Ser. No. 57,715, filed June 1, 1987 as a continuation of now abandoned Ser. No. 709,852, which was filed Mar. 8, 1985 (typically containing 0.1–0.3% Sn, 0.05–0.40% Nb, 0.05–0.20% Fe, 300–1200 ppm oxygen, 0.03–0.1% Ni plus Cr, less than 0.25% Fe plus Cr, with the balance essentially Zr); Ser. No. 589,300, filed Mar. 14, 1984 (typically containing 0.1–0.6% Sn, 0.07–0.24% Fe, 0.05–0.15% Cr, less than 0.05% Ni, with the balance essentially Zr); Ser. No. 709,865, filed Mar. 8, 1985 (typically containing 0.19–0.60% Sn, 0.19–0.50% Fe, 0–0.3% Ni, 100–700 ppm oxygen, with the balance essentially Zr); and Ser. No. 71,588, filed Mar. 8, 1987 (typically containing 0.4–0.6% Sn, 0.5–1.4% Fe, 100–700 ppm oxygen, with the balance essentially Zr).

The preceding applications are all assigned to the same assignee and are all hereby incorporated by reference.

BACKGROUND OF THE INVENTION

1. Field of the Invention

This invention relates to zirconium and zirconium alloys, and in particular relates to processes for making purified zirconium for use in liner for reactor cladding.

2. Description of the Related Art

In the commercial production of zirconium and hafnium metal, the ore is generally initially subjected to a chlorination step which produces a relatively impure, hafnium containing, zirconium tetrachloride and by-product silicon tetrachloride (which by-product is relatively easily separated). The zirconium and hafnium containing material is then subjected to a number of purifying operations and also a complex hafnium separation operation. These operations result in purified oxides of zirconium and hafnium which, of course, are thereafter maintained separate. The purified oxides are then separately chlorinated. Zirconium and hafnium are typically reduced from the chloride by means of a reducing metal (generally magnesium). Excess reducing metal and by-product salt, (e.g. magnesium and magnesium chloride) are removed from the so-called zirconium "sponge" by a distillation step. The zirconium metal is then generally double or triple vacuum arc melted to produce an ingot, which is then further processed (e.g. into zircaloy tubing for reactor fuel element cladding).

Ultrapure zirconium has been proposed for a liner for the inside surface of Eircaloy tubing for use as a cladding for reactor fuel, as described in, for example, U.S. Pat. No. 4,372,871 to Armijo et al. on Feb. 8, 1983. A similar use, but with moderate purity material, is proposed in U.S. Pat. No. 4,200,492 to Armijo et al. on Apr. 29, 1980.

Ultrapure zirconium has been produced in iodide cells by the so-called "crystal bar" process, (a very expensive process which produces a very soft, about 90 Brinell, product) as discussed, for example, in U.S. Pat. No. 4,368,072 issued to Siddall on Jan. 11, 1983. Material for lining cladding for reactor fuel elements by electron beam (EB) melting is disclosed in Japanese Patent Application No. 1979-144,789 by Kawakita et al., published June 8, 1981. That application discloses utilizing electron beam melting as the final melting, in a quite small laboratory (rather than commercial EB furnace).

Commercial reactors generally use either Zircaloy-2 or Zircaloy-4. The history of the development of Zircaloy-2 and Zircaloy-4 is summarized in: Kass, "The Development of the Zircaloys", ASTM Special Technical Publication No. 368 (1964), pages 3–27. Also of interest with respect to Zircaloy development are U.S.

Pat. Nos. 2,772,964; 3,097,094; and 3,148,055. Zircaloy-2 is a zirconium alloy having about 1.2–1.7 weight percent (all percents herein are weight percent) tin, 0.07–0.20 percent iron, about 0.05–0.15 percent chromium, and about 0.03–0.08 percent nickel. Zircaloy-4 generally contains about 1.2–1.7 percent tin, about 0.18–0.24 percent iron, and about 0.07–0.13 percent chromium.

U.S. Pat. No. 4,675,153 is a zirconium alloy having generally somewhat less alloying agent content (typically 0.2–0.6 Sn, 0.03–0.11 Fe, less than 0.02 Cr, less than 350 ppm oxygen, with the balance essentially Zr) and U.S. Pat. No. 4,613,479 is an example of a niobium zirconium alloy with less than 59% Zr (these two U.S. patents are hereby incorporated by reference).

EB (electron beam) melting of materials, including zirconium, has been discussed in a number of patents. EB melting has been used to consolidate crushed particles or chips in so-called hearth furnaces and to separate impurities by either overflowing floating inclusions (U.S. Pat. No. 4,190,404 to Drs et al. on Feb. 26, 1980) or to produce an electrode for arc melting (U.S. Pat. No. 4,108,644 to Walberg et al. on Aug. 22, 1978). A number of U.S. patents have used EB melting of powders or granules, often producing an ingot in a chilled mold. These powder melting EB patents include U.S. Pat. No. 2,942,098 to Smith on June 21, 1960; U.S. Pat. No. 2,960,331 to Hanks on Nov. 15, 1960; U.S. Pat. No. 2,963,530 to Hanks et al. on Dec. 6, 1960; U.S. Pat. No. 2,997,760 to Hanks et al. on Aug. 29, 1961; U.S. Pat. No. 2,935,395 to Smith on May 3, 1960; and U.S. Pat. No. 4,482,376 to Tarasescu et al. on Nov. 13, 1984. Electron beam zone refining using multiple passes is described in U.S. Pat. No. 3,615,345 to King on Oct. 26, 1971.

EB melting using a consumable feed "electrode" to produce an ingot collected in a chilled mold has also been discussed in a number of patents, including U.S. Pat. No. 3,087,211 to Howe on Apr. 30, 1963; U.S. Pat. No. 3,226,223 to Bussard et al. on Dec. 28, 1965; U.S. Pat. No. 2,880,483 to Hanks et al. on Apr. 7, 1959; and U.S. Pat. No. 4,130,416 to Zaboronok et al. on Dec. 19, 1978. U.S. Pat. No. 3,219,435 to Gruber et al. on Nov. 23, 1965 shows a commercial type EB furnace utilizing multiple beams. Typically the beams are directed to the surface of the molten pool and are continually swept across the pool surface to avoid overheating of any single portion of the pool surface. U.S. Pat. No. 3,091,525 to D'A. Hunt on May 28, 1963 describes adding a small amount of zirconium, for example, to hafnium, for example and melting in an EB furnace to deoxidize the hafnium.

SUMMARY OF THE INVENTION

This is a process for making an alloyed liner material for reactor fuel element cladding. This invention provides for significant reduction of oxygen and metallic impurity content and produces a more consistent product due to reduced solid solution strengthening and second phase formation. The alloyed liner has improved corrosion resistance, but generally has the high ductility of the commonly used unalloyed liner material.

The process utilizes electron beam melting of sponge zirconium, at a very slow feed rate (less than 1 inch per hour), to reduce oxygen and metallic impurities (especially aluminum and in some cases iron). The electron beam melted zirconium is then alloyed in a vacuum arc furnace by means of an alloying charge. The alloying charge has 0.1–2.0 weight percent of tin, and, in some embodiments, the alloying charge also contains 0.02–2.0 weight percent of at least one additional alloying agent selected from the group consisting of iron, niobium, chromium, molybdenum, and copper. In one preferred embodiment, the liner material contains less than 175 ppm of oxygen and less than 50 ppm of iron.

DESCRIPTION OF THE PREFERRED EMBODIMENT

This invention provides process for producing liner material for Zircaloy reactor fuel cladding similar to the lined cladding described in the aforementioned U.S. Pat. Nos. 4,372,817 and 4,200,492, except the liner material, rather than being pure or ultrapure zirconium, is, in the invention hereindescribed, a zirconium alloy.

While so-called crystal bar material has been proposed for lining of fuel element cladding, such material is generally too expensive for commercial use and too soft for reliable production use, and so-called "sponge" zirconium has generally been used for such lined cladding. The sponge material is typically selected from the lower oxygen containing batches of normal zirconium production, and generally contains 500–600 ppm of oxygen. Such material is referred to as "sponge" or "selected sponge" as the purity is generally determined by the purity at the reduction to sponge step. There is practically no purification of the metal after reduction (the distillation and vacuum melting are generally viewed as the separation of magnesium chloride by-product and excess magnesium left over from reduction, rather than as purification, and the only other thing removed in the double or triple vacuum melting is a very small amount of manganese). Thus the purity of the metal in the final product in such material is generally the same as the purity of the metal in the sponge configuration produced by reduction (the reduction product, although metallic, has a sponge-like appearance).

Recently, so-called "EB" material has been used to line cladding (as noted in the aforementioned copending U.S. patent application Ser. Nos. 871,182 and 871,183). This EB material has been significantly further purified by melting in an electron beam furnace at about 4–16 inches per hour, generally to reduce the iron content. Typically, the iron content of sponge is in the 500–800 ppm range, and EB melting in one or two passes at such speeds is utilized to lower the iron content to the 200–300 ppm range.

In addition to crystal bar, sponge, and EB melted zirconium, it has also been proposed that zirconium alloyed with 0.5–1.5 percent tin be utilized for liner material. A zirconium alloy liner is also described in the aforementioned U.S. Pat. No. 4,675,153, which alloy contains about 0.2–0.6 weight percent tin, about 0.03–0.11 percent iron, and up to about 350 ppm oxygen.

In particular, typical sponge has an aluminum content of 40–50 ppm (the ASTM Spec B349-80, cited in that patent prescribes a 75 ppm maximum). The process of this invention will give aluminum of less than 5 ppm (experimental runs produced zirconium containing less than 2 ppm of aluminum and less than 10 ppm silicon). In addition, this invention will reduce the chromium content from typically about 100 ppm (the aforementioned specification calls for 200 ppm chromium max) to less than 10 ppm chromium (typical measured numbers were about 5 ppm chromium). While chromium, unlike aluminum, is not generally considered detrimental in many alloys, reducing the chromium and silicon reduces lot-to-lot property variability due to second phase formation. The aluminum reduction reduces solid solution strengthening. When the reduced aluminum is combined with low oxygen content, ultra-slow EB melting of this invention the hardening produced by the alloying agent (e.g. tin) is at least partially compensated by the softening effect of the lesser oxygen and lesser aluminum. When only a small amount of alloying agent is used, this can provide a material which is soft and ductile enough to substantially impede crack propagation (generally less than 125 Brinell) while being hard enough for reliable fabrication (generally at least about 105 Brinell) and having corrosion properties superior to non-alloyed zirconium.

The ultra-slow EB melting provides oxygen removal (as well as generally removing aluminum, iron, chromium and other metallic impurities). The oxygen removal in a commercial EB furnace is very surprising as, although previously reported in a very small laboratory furnace, there had previously been no indication of any oxygen reduction in a commercial EB furnace.

The so-called "pellet-cladding-interaction" has caused crack initiation on the inside surface of cladding, and while the zirconium lined cladding of the prior art greatly reduces such cracking, such a zirconium liner is susceptible to steam corrosion. The alloys of the process of this invention combine the resistance of crack propagation with, as compared to unalloyed zirconium, improved resistance to steam corrosion. In particular, this process provides for very low metallic impurity content (especially aluminum), combined with very low oxygen content. Metalloids, such as phosphorous and silicon, are also reduced.

In a preferred embodiment, zirconium tetrachloride is reduced to metallic zirconium utilizing low oxygen magnesium (e.g., magnesium treated by the process described in copending application Ser. No. 17,301) and, after distillation, the low oxygen sponge is prebaked to remove absorbed water (generally the process of the aforementioned copending application Ser. No. 871,182) and the material is ultra-slow electron beam melted at less than 1 (and preferably less than about ¾ and most preferably about 1/10-½) inch per hour and then double or triple vacuum arc melted (generally EB and vacuum arc melting as taught in copending application Ser. No. 871,183, except that the EB melting is at a much slower rate, the rate being sufficiently slow to cause significant oxygen removal, and that an alloying charge is added to the vacuum arc melting electrode). In one embodiment, the alloying charge added during vacuum arc melting contains 0.1–0.75 weight percent of alloying agent selected from tin or niobium or a combination of the two, and may in addition, contain 0.02–0.3 weight percent of additional alloying agent, the additional alloying agent being selected from the group consisting of iron, chromium, molybdenum, copper, and combinations thereof.

Preferably the alloying elements are either tin and niobium or tin and iron or just tin. Most preferably, iron is not utilized for alloying. The ingot of vacuum arc melted zirconium alloy can then be fabricated into the liner of reactor fuel element cladding, providing an essentially aluminum-free material (as used herein, the term "essentially aluminum-free" means having less than 5 ppm aluminum), having less than 400 ppm oxygen. More preferably, the process is controlled to provide material containing less than 300 ppm oxygen (and most preferably less than 175 ppm). In addition, when iron is not used as an alloying agent, the material preferably contains less than 100 ppm iron (and most preferably less than 50 ppm iron). The material also preferably contains less than 10 ppm chromium and most preferably less than about 5 ppm chromium. Other than iron and oxygen, the material preferably contains less than 100 ppm of impurities.

Thus, it can be seen that the process of this invention produces an alloy liner (rather than a liner of unalloyed zirconium) having an extremely low metallic impurity level (especially low aluminum and also preferably low iron) and having a very low oxygen level and provides a consistent and lower corrosion (as compared to unalloyed zirconium) liner. In the embodiment alloyed with only about 0.1–0.4% tin, and with very low oxygen and very low iron, the process can produce a liner material having a Brinell hardness of about 105–125 (similar to unalloyed sponge having 500–600 ppm of oxygen), thus combining fabricability, crack arresting capability and corrosion resistance. It is believed that such material, being hardened by tin, rather than oxygen, is less subject to irradiation embrittlement and thus gives better crack propagation resistance under irradiation.

The invention is not to be construed as limited to the particular examples described herein as these are to be regarded as illustrative, rather than restrictive. The invention is intended to cover all processes which do not depart from the spirit and the scope of the invention.

We claim:

1. A process for making an electron beam melted fuel element liner material from sponge zirconium, said process comprising:
   a. electron beam melting sponge zirconium at a melting rate of less than 1 inch per hour to form an electron beam melted zirconium material containing less than 300 ppm iron, less than 400 ppm oxygen, and less than 5 ppm aluminum; and
   b. alloying said electron beam melted zirconium in a vacuum arc furnace with 0.1–2.0 weight percent of tin.

2. The process of claim 1, wherein said alloying is done with 0.02–2.0 weight percent of additional alloying agent, said additional alloying agent being selected from the group consisting of iron, niobium, chromium, molybdenum and combinations thereof.

3. The process of claim 2, wherein said additional alloying element is niobium.

4. The process of claim 3 wherein said electron beam melting is at 1/10–½ inch per hour.

5. The process of claim 4, wherein the electron melted zirconium contains 0.1–0.4 tin as the only alloying element and contains less than 100 ppm iron, and less than 300 ppm oxygen and less than 100 ppm of other impurities.

6. The process of claim 1, wherein said electron beam melting is at 1/10–½ inch per hour.

7. The process of claim 1, where the electron beam melted zirconium contains less than 175 ppm oxygen and less than 50 ppm iron.

* * * * *